United States Patent
Nagpal et al.

(10) Patent No.: US 9,135,434 B2
(45) Date of Patent: Sep. 15, 2015

(54) SYSTEM AND METHOD FOR THIRD PARTY CREATION OF APPLICATIONS FOR MOBILE APPLIANCES

(75) Inventors: Aashin Nagpal, Cupertino, CA (US); Kenneth Chul Singer, Brisbane, CA (US); Holger Assenmacher, Eulenbis (DE)

(73) Assignee: APPCENTRAL, INC., San Francisco, CA (US)

( * ) Notice: Subject to any disclaimer, the term of this patent is extended or adjusted under 35 U.S.C. 154(b) by 0 days.

(21) Appl. No.: 13/087,322

(22) Filed: Apr. 14, 2011

(65) Prior Publication Data

US 2011/0276805 A1 Nov. 10, 2011

Related U.S. Application Data

(60) Provisional application No. 61/342,790, filed on Apr. 19, 2010.

(51) Int. Cl.
*G06F 21/24* (2006.01)
*G06F 21/51* (2013.01)
*H04L 29/06* (2006.01)

(52) U.S. Cl.
CPC ............ *G06F 21/51* (2013.01); *H04L 63/0823* (2013.01); *G06F 2221/2107* (2013.01); *G06F 2221/2115* (2013.01)

(58) Field of Classification Search
USPC ........................................................ 713/189
See application file for complete search history.

(56) References Cited

U.S. PATENT DOCUMENTS

| | | | | |
|---|---|---|---|---|
| 5,325,531 | A * | 6/1994 | McKeeman et al. | 717/145 |
| 5,724,425 | A * | 3/1998 | Chang et al. | 705/52 |
| 6,672,505 | B1 * | 1/2004 | Steinmetz et al. | 235/379 |
| 6,684,389 | B1 * | 1/2004 | Tanaka et al. | 717/140 |
| 7,024,564 | B2 * | 4/2006 | Pavlin et al. | 713/192 |
| 7,171,693 | B2 * | 1/2007 | Tucker et al. | 726/26 |
| 7,234,636 | B1 * | 6/2007 | Brausch et al. | 235/379 |
| 7,290,137 | B2 * | 10/2007 | Yamamoto et al. | 713/167 |
| 7,322,045 | B2 * | 1/2008 | Kiddy | 726/26 |
| 7,437,570 | B2 * | 10/2008 | Shackelford | 713/189 |
| 7,770,001 | B2 * | 8/2010 | Milton et al. | 713/156 |
| 7,788,727 | B2 * | 8/2010 | Shintani | 726/26 |
| 7,841,009 | B1 * | 11/2010 | Smith | 726/26 |
| 7,930,557 | B2 * | 4/2011 | Novosad | 713/190 |
| 7,958,373 | B2 * | 6/2011 | Manferdelli et al. | 713/189 |
| 7,996,671 | B2 * | 8/2011 | Chheda et al. | 713/164 |
| 8,271,802 | B2 * | 9/2012 | Orsini et al. | 713/189 |
| 2004/0025009 | A1 * | 2/2004 | Camber et al. | 713/152 |
| 2004/0103406 | A1 * | 5/2004 | Patel | 717/140 |
| 2004/0148502 | A1 * | 7/2004 | Gollner et al. | 713/167 |

(Continued)

*Primary Examiner* — Dede Zecher
*Assistant Examiner* — Richard McCoy
(74) *Attorney, Agent, or Firm* — EIP US LLP

(57) ABSTRACT

The creation of an application for any mobile appliance, for example Apple's iPhone, requires several elements to be present at compile time. In the Apple example of an enterprise application where an entity wishes to develop applications internally for its staff, two of these elements are the source code and a digital certificate. These must be combined in the compiler so that the application may be properly authorized to run in the appliance. Where the owner of the source code and the owner of the digital certificate are not the same, serious concerns arise because each element must be secured. An intermediating system and method are described that allows each party to cooperate securely through a third party escrow service to produce the complied application while leaving no unwanted residue of the independent parts.

18 Claims, 5 Drawing Sheets

(56) References Cited

U.S. PATENT DOCUMENTS

| | | | |
|---|---|---|---|
| 2004/0161110 A1* | 8/2004 | Kanai et al. | 380/279 |
| 2005/0005103 A1* | 1/2005 | Atkin et al. | 713/165 |
| 2005/0210273 A1* | 9/2005 | Gersten et al. | 713/189 |
| 2005/0222960 A1* | 10/2005 | Hatlelid | 705/59 |
| 2006/0075263 A1* | 4/2006 | Taylor | 713/194 |
| 2006/0085352 A1* | 4/2006 | Hug | 705/59 |
| 2006/0225043 A1* | 10/2006 | Oda et al. | 717/124 |
| 2006/0294369 A1* | 12/2006 | Matsushima et al. | 713/164 |
| 2008/0046714 A1* | 2/2008 | Suganthi et al. | 713/150 |
| 2008/0270310 A1* | 10/2008 | DeGraaff et al. | 705/58 |
| 2009/0307781 A1* | 12/2009 | Iga et al. | 726/27 |
| 2010/0115501 A1* | 5/2010 | Partridge et al. | 717/148 |
| 2010/0205586 A1* | 8/2010 | Mun | 717/140 |
| 2010/0223469 A1* | 9/2010 | Hussain et al. | 713/175 |
| 2010/0313079 A1* | 12/2010 | Beretta et al. | 714/48 |
| 2011/0040964 A1* | 2/2011 | Nussbaum et al. | 713/155 |
| 2011/0040973 A1* | 2/2011 | Jonnagadla et al. | 713/170 |
| 2011/0197077 A1* | 8/2011 | Chan et al. | 713/189 |
| 2011/0225420 A1* | 9/2011 | Eigler et al. | 713/158 |
| 2012/0185700 A1* | 7/2012 | Vidrine et al. | 713/189 |
| 2014/0173759 A1* | 6/2014 | Essary et al. | 726/30 |

\* cited by examiner

SYSTEM AND METHOD FOR THIRD PARTY CREATION OF APPLICATIONS FOR MOBILE APPLIANCES

BACKGROUND OF THE INVENTION

Cellular telephony has progressed from a simple voice service to the point where the actual telephony application is no longer the dominant service. With the tremendous advances in the manufacturing process, amply supported by dramatic increases in the levels of integration in the semiconductor industry, coupled with remarkable developments in display technologies, modern cellphones are, more accurately, sophisticated computing appliances. The wireless connectivity means that the delivery of program information to the cellphone, colloquially a smartphone, can be done without much regard for the location of the appliance but this feature creates a new series of concerns in as much as the benefit of an unwired environment lends itself to misuse of the appliances. Application programs can be created and downloaded to the appliance with little in the way of security or privacy, with the risk being hard to mitigate.

Development of applications (Apps) for mobile appliances requires some mechanism for ensuring that the application is legitimate and will not cause harm to either the appliance itself or to the network to which it is connected. The very benefit of having an appliance which is not limited by way of mobility, exposes the appliance to malicious interference including theft of the information carried on the appliance. Service Providers, the wireless carriers, are understandably most concerned about malicious interference with their services, whereas appliance manufacturers are equally concerned for their reputations. An appliance which is easily interfered with rapidly gains user distrust and a manufacturer is left vulnerable to an angry customer base. Examples of abuse may be seen in the rise of malware (malicious software) targeting Android powered appliances and the extensive media commentary on the woes of the manufacturers.

It is therefore clear that one of the essential elements in managing application programs that may be provided to a mobile appliance, such as a smartphone, is an assurance that the program itself is genuine and is free from functionality which would allow either the appliance, or the network to which it may be connected, to be compromised.

General deployment of Applications for broad consumption is normally managed through a proprietary distribution mechanism and individuals may acquire applications by interacting with this on-line store. A seminal example is the Apple iTunes Store which is specifically engineered around the distribution and maintenance of software. In particular, the management of downloaded software and the associated rights management practices are addressed and the model incorporates a mechanism whereby a user may be automatically notified of a change or upgrade to an application which has already been downloaded to the user's appliance.

Distribution of applications in practice requires the user to either download them from a server (the virtual store) directly to the mobile appliance through a wireless network or else download them to a computer and then synchronize the application to the mobile appliance. Any payment due is controlled through this server or store and is tied to an individual's service account, whether a mobile phone account or a direct account set up separately to the on-line store. These processes are known in the art and are primarily aimed at single users.

Corporations which are large usually prefer to customize their software, often to preserve brand and to differentiate from generic software. These customization efforts may be minor or substantial but, as such, the consumer model of an application store is not considered to be appropriate; public availability or even awareness of proprietary software serves little useful purpose for the proprietor and indeed may offer insights that might expose trade secrets. Consequently, there has been significant demand from the larger corporations for the ability to create and maintain their own applications coupled with a strong preference for internal distribution mechanisms.

To support corporate activity, it is important for the appliance vendor to recognize the essential differences between the needs of a consumer and that of a large entity with many employees or associates. For example, Apple has created a license framework that allows corporations which exceed certain user-size thresholds to be treated as a single entity and to build applications that are strictly for internal use. Strategically this may be quite important if appliances like the iPhone and iPad continue to gain acceptance inside corporations. Other manufacturers such as RIM, maker of the Blackberry series of appliances, and Samsung and Motorola, with their cellphone and tablet lines of appliances, have similar needs and concerns. It becomes critical for companies to be able to develop and build their own software applications without unnecessary constraints that may be simply an artifact of a incompletely thought out rule set.

Returning to the example of the Apple license for applications, as part of this process of development and certification a corporation may apply for and receive a digital certificate in conjunction with access to the software tools which will allow it to develop internal applications for its employees. Because this certificate represents an operating authority that permits a user appliance to run associated, downloaded software, an essential condition is that this certificate must be maintained secure and shall not be shared with others. Failure to safeguard this digital authority is punishable by revocation of the authority, with the consequence that the corporation may then no longer use its applications on the mobile devices and appliances which are being used by its associates and employees.

As to the development of an application, a corporation which does not routinely develop software may engage the services of an external contractor to perform these duties and in so doing may permit the external contractor access to their digital certificate for incorporation with the application software during the compilation process. The creation of bespoke software for the corporation is a relatively straightforward process but when software already in commercial service is to be modified, then a concern arises. Commercial software packages commonly have enormous resource invested in their development and are often the jewel in their developer's crown; exposure of the source code, a necessary element when a derivative is to be made that incorporates other information such as an authorization to run on a mobile appliance. This often represents an unacceptable risk to the developer. Normal delivery of a commercial software package is usually limited to an executable object and this developer will almost certainly be unwilling to give the source code to a corporation that wants a bespoke application which is a variant of a commercial package. Source code is generally a man-readable set of instructions and comments that represents the eventual operation of a machine. To create a program that is understandable by the intended machine, the target or object, then the man-readable code is compiled. Compilation parses or "makes sense" of the man-readable instructions and builds a structure and instruction list that the target machine can use to operate within. For example if an instruction implies certain storage needs, then the compiler will allocate this storage so that the machine is not confounded. Comments which are normally written to enable explanation to persons working with the source code are entirely surplus and serve no purpose for the machine so the compiler simply discards these. Eventually after a few runs through the source code, "passes" in the art, the compiler is able to fabricate a set of machine instructions suitable for execution by the target machine. This output program from the compiler is termed "object code" since it runs on the intended object, and is no longer readable by a person.

The corporation may, likewise, be unwilling to trust the developer of the commercial software with their digital certificate in light of the consequent risk of exposure of their brand through inappropriate use. It may be surmised that a transaction of this nature demands extraordinary trust between participants and very careful security provisions to protect the data such that such a transaction to the mutual satisfaction of the partners may, generally, not be possible.

SUMMARY OF THE INVENTION

This invention is a system and method that permits development and deployment of an application where the application developer is a supplier and is not the same as the owner of the eventual application program that is to be deployed. This invention allows both the provider of the source code for the application and the holder of the digital certificate, which authorizes the program to run on the intended mobile appliance or appliances, to co-operate and to remit information separately and securely to a server so that data representative of these two elements may be stored temporarily as encrypted files prior to combination in the compiler. When the application program which is to be delivered to appliances is built, the compiler, which does the building, is invoked to build the object and at that time, these separate encrypted files are declared to the compiler. The digital certificate may normally be expected to be a relatively simple, short text string and may be decoded upon declaration. Once compilation is underway, files that are no longer needed may be erased. The application source code may be decoded prior to parsing by the compiler in a way that prevents it from appearing completely "in the clear". Once the compilation is complete, the decoding keys used to reveal the encrypted files may be erased and access to the two source elements prevented by further erasing those encrypted files.

Note, that the various features of the present invention described above may be practiced alone or in combination. These and other features of the present invention will be described in more detail below in the detailed description of the invention and in conjunction with the following figures.

BRIEF DESCRIPTION OF THE DRAWINGS

In order that the present invention may be more clearly ascertained, some embodiments will now be described, by way of example, with reference to the accompanying drawings, in which.

DETAILED DESCRIPTION OF THE INVENTION

Figure 1:
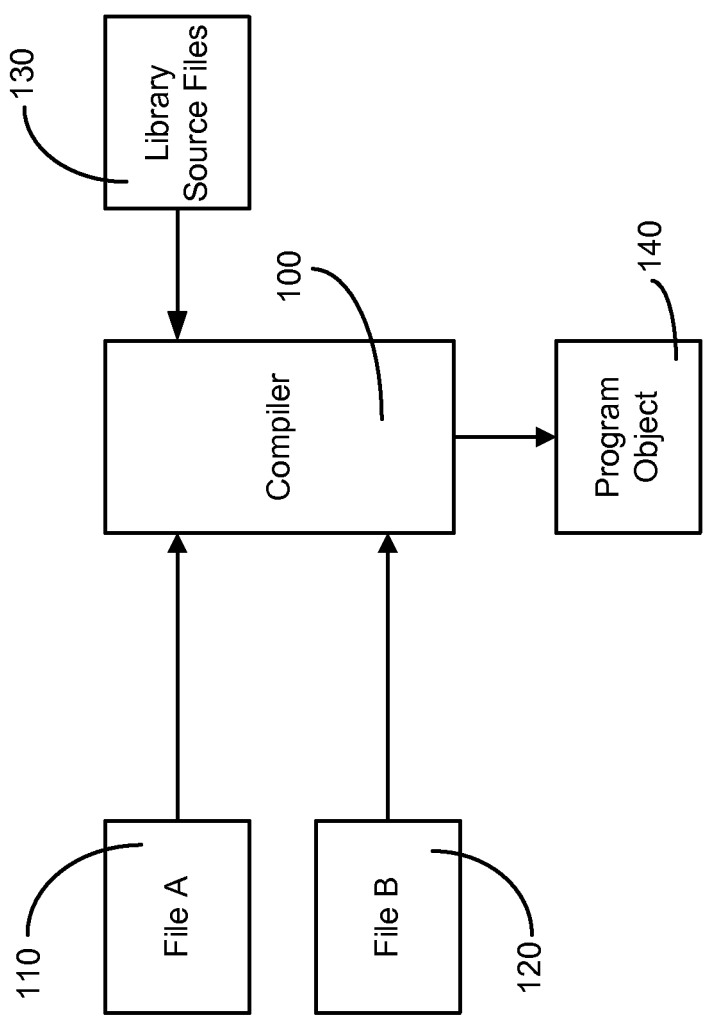
FIG. 1 shows a simple structure representing the process of building an executable object.

In the normal development of an application which may be intended to be used in the environment defined by Apple, for use on its iPhone and iPad appliances, two basic elements are required. The source code for the application and a digital certificate, issued by Apple, which is the authority that permits operation on the appliance to which the software object may be downloaded. The process for authorizing an application may often be governed by a formal agreement that sets out terms and conditions that determine quite precisely how this may be done. These terms and conditions are necessarily very strict to prevent the spread of malicious software (malware) whether deliberate, accidental or the result of some undocumented component of otherwise innocuous software. For example, certain browsers have been shown to exhibit serious flaws that permit access to the machine that were unintended by the original developer. This has resulted in high profile security lapses and the implication for a mobile network assailed by some malicious software interference may be simply disastrous.

Using the example of Apple's iPhone is representative of the entire process of App creation and is only intended to offer a reference point; the same general process may be followed for all examples. Although the fine detail of development for, say, the Blackberry Playbook or the Samsung Tab may differ at the low level, the principles of control of the application are relatively consistent. General deployment of Apps for broad consumption may normally be managed through an on-line store which may comprise a proprietary distribution mechanism and individuals may be permitted to acquire applications by interacting with this on-line store. Distribution of applications in practice may require the user to first of all identify the application(s) being sought and, subsequently, either download it/them to the mobile appliance through the carrier's wireless network, or via some other internet link such as a WiFi connection which may be private or public, or else download it/them to a computer and then synchronize the application to the mobile appliance. Again, this may vary with particular devices or appliances depending on the model in use, but the principles embodied serve the same purposes. Any payment which may be due may be controlled through this on-line store and may be tied to an individual's service account, whether a mobile phone account or a direct account set up separately to the on-line store. In practice, even a "free" application may be billed but with a zero amount as the balance; this may serve to maintain a uniform presentation environment. These processes are known in the art and are principally aimed at discrete single users.

In order to create or build an application, or indeed any executable program, it may be necessary to encode or compile the program and its elements in a form that is machine readable. Examples of interpreted source code such as found in the "Basic" language wherein program code generates machine operation in a line by line format may be considered simple curiosities in the art since they are comparatively inefficient and slow and may be ill suited for any serious application in current equipment. Similarly, simple computer programs using short programs may be entirely constructed in machine language by an adept programmer, but for any degree of complexity it may be preferred that the program and its elements are easily written and read by the human programmer.

A software file that is human generated may often be a text file and may incorporate notes, comments and spaces that are intended to aid the programmer rather than having any executable program value. Such a program may be considered a source file since it may be the starting point for subsequent actions. Once a program has been written, it may be translated or compiled into machine language, often as a binary file, which may be subsequently executed by the intended target machine or appliance. During this compilation, items that do not matter to the machine, such as any notes or comments or spaces added for the convenience of the programmer, may be ignored or discarded by the compiler. A common programmer device when fault-finding a misbehaving program may be to temporarily remove suspected program elements by "commenting out" the lines of the program and relying on the compiler's behavior to disregard "comments" thus temporarily precluding these elements from operating.

One feature of a compiler is that several programs or elements that are not essentially interdependent may be combined so that a single executable program may be constructed, which single program has the combined capability of the initial elements. For example, if a programmer wishes to write a program to interact with a keyboard and also a program to interact with a screen, then these two programs which may be written independently may be combined in a compiler to produce a program that interacts with both a keyboard and a screen. Compilers may be very efficient and the resulting composite program, being a binary file that may have no obvious structural arrangement that is obvious to the human programmer, may be impractical to change directly and so, if a change is to be made, it may best be made at the source code level and the program re-compiled to incorporate those changes or modifications. Another powerful feature of a compiler is its ability to include certain kinds of desired program features which are re-used frequently; for example mathematics routines to divide numbers or to multiply numbers may be stored in a file library, often stored locally with the compiler, and may be incorporated simply by asking for (declaring) that standard file.

Referring to FIG. 1, the essential features of a typical compiler will be described. A compiler 100 may be instructed to take File A 110 and File B 120 and perhaps other files 130, for example a series of instructions to manage the user interface components such as sounds and display operations from a library, and incorporate them all together to produce an output program or object file, File C 140 which may execute on the intended target appliance. In practice, the compiler may make several passes through the source code in which it may parse the information so that it is able to build suitable structures such as tables and data stores, reserving sufficient memory for the final program to operate. For example, it may be necessary for the executing program on the appliance to perform precise calculations involving long numbers as would be the case for an application that performs the functions of a calculator. Provision would have to be made to allow for the significant amount of memory to be set aside for this work. Similarly if colors are to be changed on a screen, then significant memory may be required in contrast to that needed to simple alter a few shades of grey when moving from black to white. The compiler may need to make cross references within the program source that may require more than a single pass to allow a complete listing of requirements to be generated. Fortunately, some compilers may only need to read a line at a time so that at no time may the entire code be needed to be stored as a single entity in memory, in the clear.

In the context of the case discussed where an application requires not only a source program but also some authorization certificate, these files would both have to be made available to the compiler. This may require that both files be downloaded to the compilation machine in plain form (in the clear) and may present difficulties for the owners of the respective pieces when these are not the same entity. The loss of control of the data by placing it on a machine under the control of another represents a formidable hurdle for most owners. However, depending on the particular implementation and the complexity of the structures, the files may not be needed contemporaneously and suitable constructs may be built by simply reading the files serially. Even then, the security concerns of the information owners may not be satisfied.

The present invention provides a mechanism whereby an owner of a sensitive file may be assured of enhanced protection for the data. There are several recognized points of vulnerability any time a data file is stored or moved. A local machine may be secured by limiting access to it. This may be done physically or virtually; i) physical security may place the machine under lock and key and may restrict access to one or more trusted persons and ii) virtual security may encrypt the data so that the stored information is obfuscated and is not visible in the clear. In this latter case, effort may be made to ensure that the secure information cannot be perceived outside the environment of the compiler nor stored for later inspection.

Figure 2:
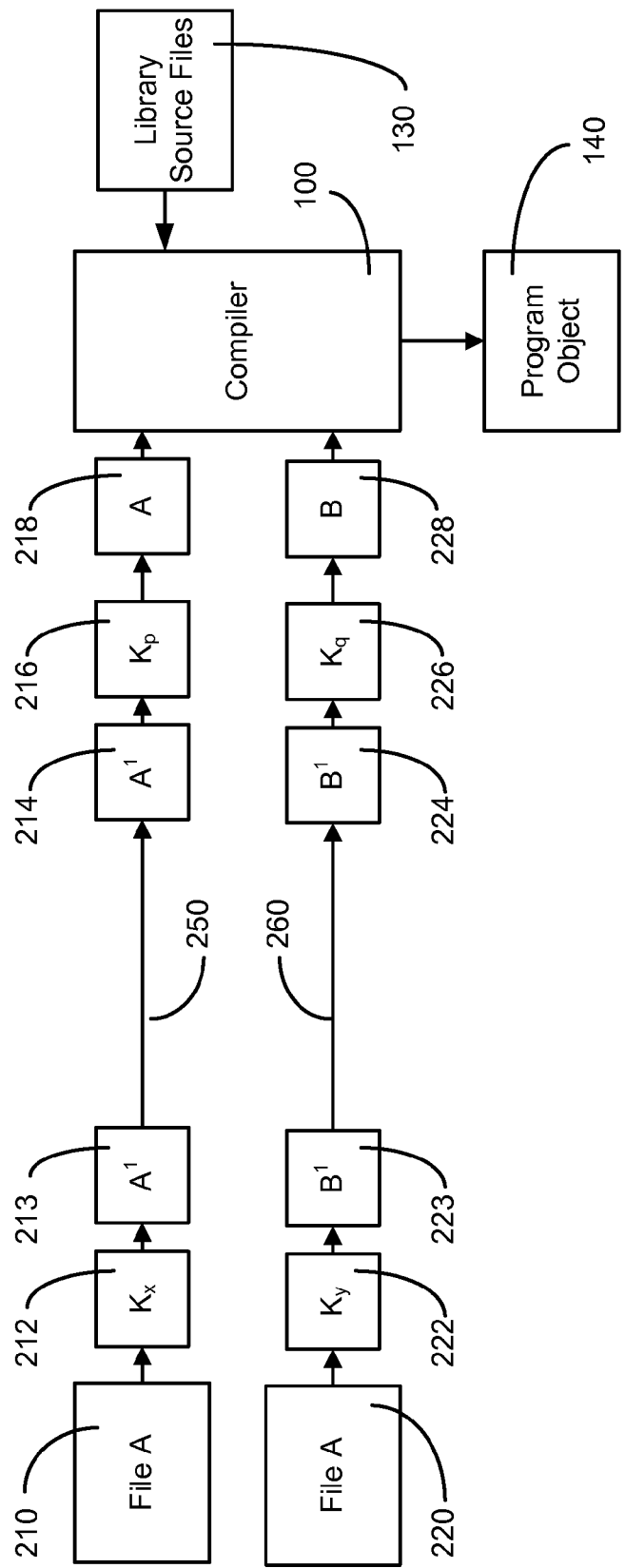
FIG. 2 shows a typical way of moving files safely to a compiler.

Another point of weakness may arise any time a data file is moved. Assuming now that the information in question is safe at the point of original generation and storage, when the data is to be moved, it may be obfuscated by first encrypting the data into a new file and then sending this latter file. So in a simple system, referring now to FIG. 2, where two files A, 110, and B, 120, both required by the compiler in order to produce the output file, are remote from the machine hosting the compiler. File A 110 may be first encrypted using encryption key $K_x$ 212 and this resulting encrypted file $A^1$ 213 may either be stored locally and transmitted later or else may be encrypted entirely during the transmission process. That is to say that the action of choosing to transmit a file may automatically invoke an encryption process and may create a temporary file which is an encrypted version of the source file, which temporary file is then transmitted. The process may produce a serial data stream which is the continuous encrypt of the file and may be transmitted so that no file record of this encryption is stored at the transmitting end. In this case, $A^1$ 213, exists only as a data stream moving through a buffer. Any temporary file containing an encrypted version of the source code may be saved or may be deleted once the transmission process is completed and this entire process may be hidden from the user. In this way, the information passing through the data connection 250 may be secured from the casual eavesdropper. Methods of securing the data against determined misappropriation are well known in the art but this invention only needs to benefit from this process.

Once the information is received at the distant machine hosting the compiler, file $A^1$ may be stored 214. In a similar fashion, a different File B 120 may be dispatched from its origin to the machine hosting the compiler, resulting in an encrypted File $B^1$ 224. As is known in the art, File $A^1$ 214 and File $B^1$ 224 may be recovered to their source form by the application of a decryption algorithm using decoding keys $K_p$ 216 and $K_q$ 226, respectively. Known in the art, this would result in File A 218 and File B 228 being present for the compiler to act upon but may open up a vulnerability by storing unencrypted files. In order to maintain the security, it may be better if decoding of the encrypted files is only done shortly before the compiler needs to read the file.

In the same way as the continuous stream of encrypted data may be generated at the sending end computer, a line by line stream of decrypted information may be read by the compiler at the receiving end. In this case, A 218 may be a line by line version of File A 110 so that the compiler and the receiving machine never retain a single clear copy of File A 110. The penalty of having to send multiple instances of source lines to avoid storing even an encrypted version, File $A^1$ 213 or 214, may be mitigated by allowing the encryption $K_x$ and decryption $K_p$ keys to change so that an interception of transmitted information at the transmission path 250 reveals no clear pattern from which the original information may be discerned.

The compiler may receive the Files A and B as convenient. They may be sent simultaneously or serially as determined by the compiler mode. Not shown in the figure, for clarity, is the physical communications link between the machine hosting the compiler and the machine or machines hosting Files A and B. The links 250 and 260 are the logical channels for illustration purposes, which may or may not co-exist. The library elements normally reside on the machine hosting the compiler but may equally reside at any other convenient location. The contents of the library are generally of a private rather than secure nature. The output object file, 140, is also more generally of a private nature since other elements may be needed, for example access to a particular server, before it can be used.

Figure 3:
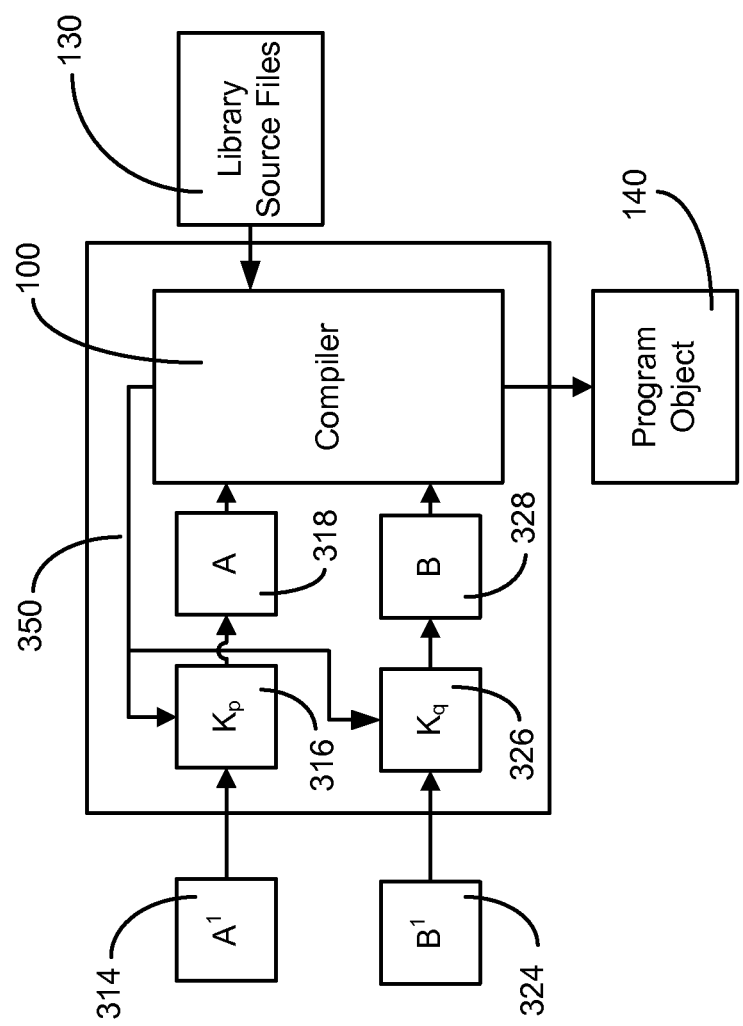
FIG. 3 shows modifications applied to practice this invention.

In one embodiment, see FIG. 3, when the compiler seeks to access a file which is still encrypted, $A^1$ 314, the process may cause the decryption of the file by invoking the decryption key $K_p$ 316 using a signal 350 from the compiler 300 thus moving a plain copy of the original File A 110 into a temporary file, A 318, which file may be read by the compiler and then may be deleted after the compiler has finished reading the file. In another embodiment, the decryption may be staged or sequenced so as to deliver to the compiler only that amount of data that the compiler demands at each read block. In this case, the decoding step using the key $K_p$ 316 and invoked by signal 350 from the compiler 300 operates only on one block of data before pausing. This block of decoded data is passed to the temporary file, A 318 so that no more than one data block exists in the clear for an encrypted file at any time. Once the compiler has read this data, then signal 350 is repeated and the next block of data replaces the earlier block of data stored at A, 318. As indicated before, this memory may be implemented as a FIFO buffer at the compiler rather than external memory and the length of the block determined entirely by the length of this buffer. Once the compiler has finished its tasks, data may be erased so that no residue of the decrypted file or files remain. In this way, no more than a single block (or line, as a simple example) of the source code for any program element need ever appear outside of the originating host environment in an unencrypted form.

Figure 4:
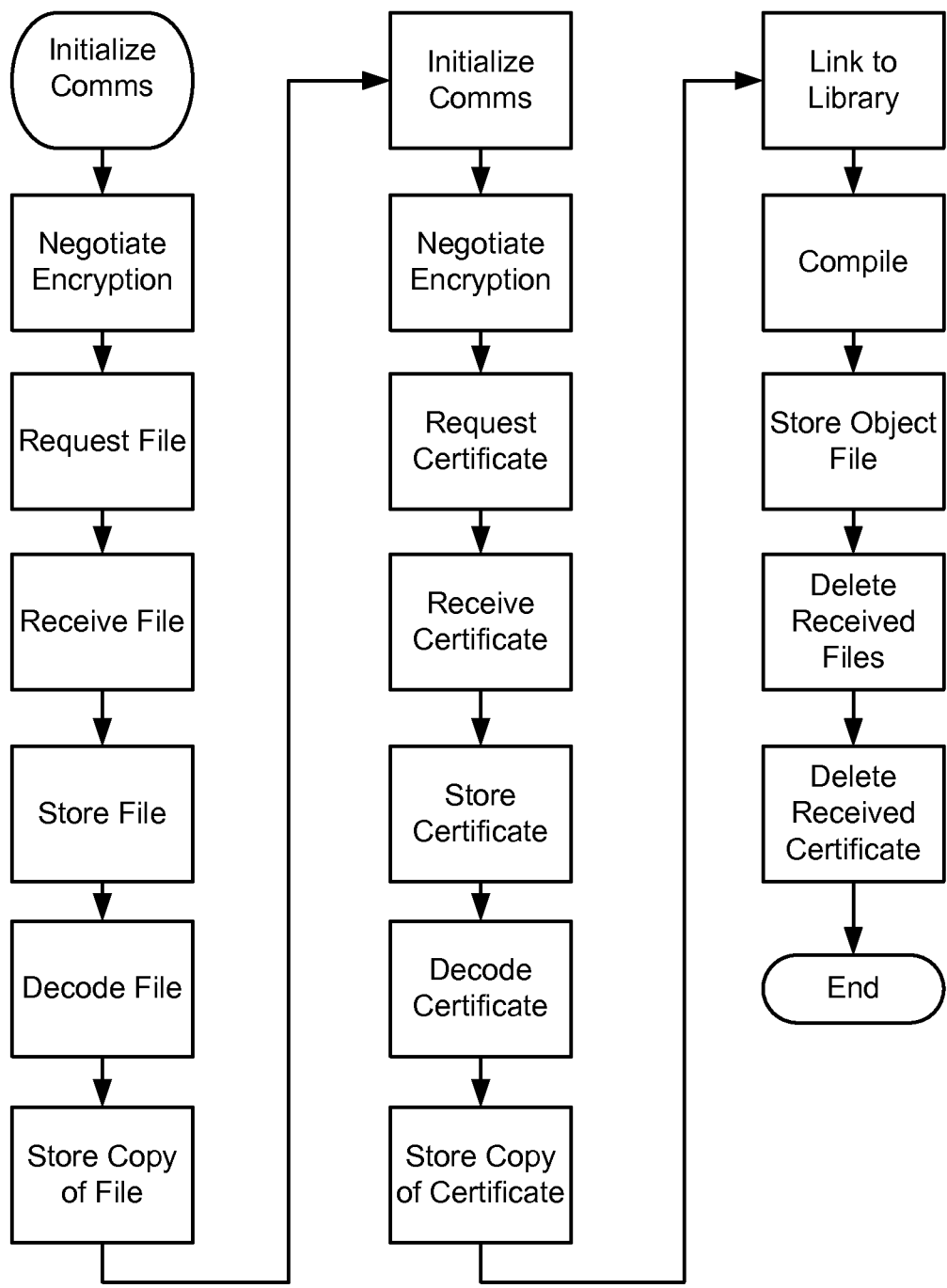
FIG. 4 is a representative flow chart illustrating the steps of the invention.

FIG. 4 is a simple listing of events representative of the steps performed in order to practice the invention. It assumes that both the digital certificate and the required source file exist on separate computers. So there may be some duplication of steps where it may be clear to one skilled in the art that overlap in functionality is easily handled and opportunities for simplification may be evident. It may also be desirable to alter the order of the steps, for example the certificate may be retrieved first and the source after.

Figure 5:
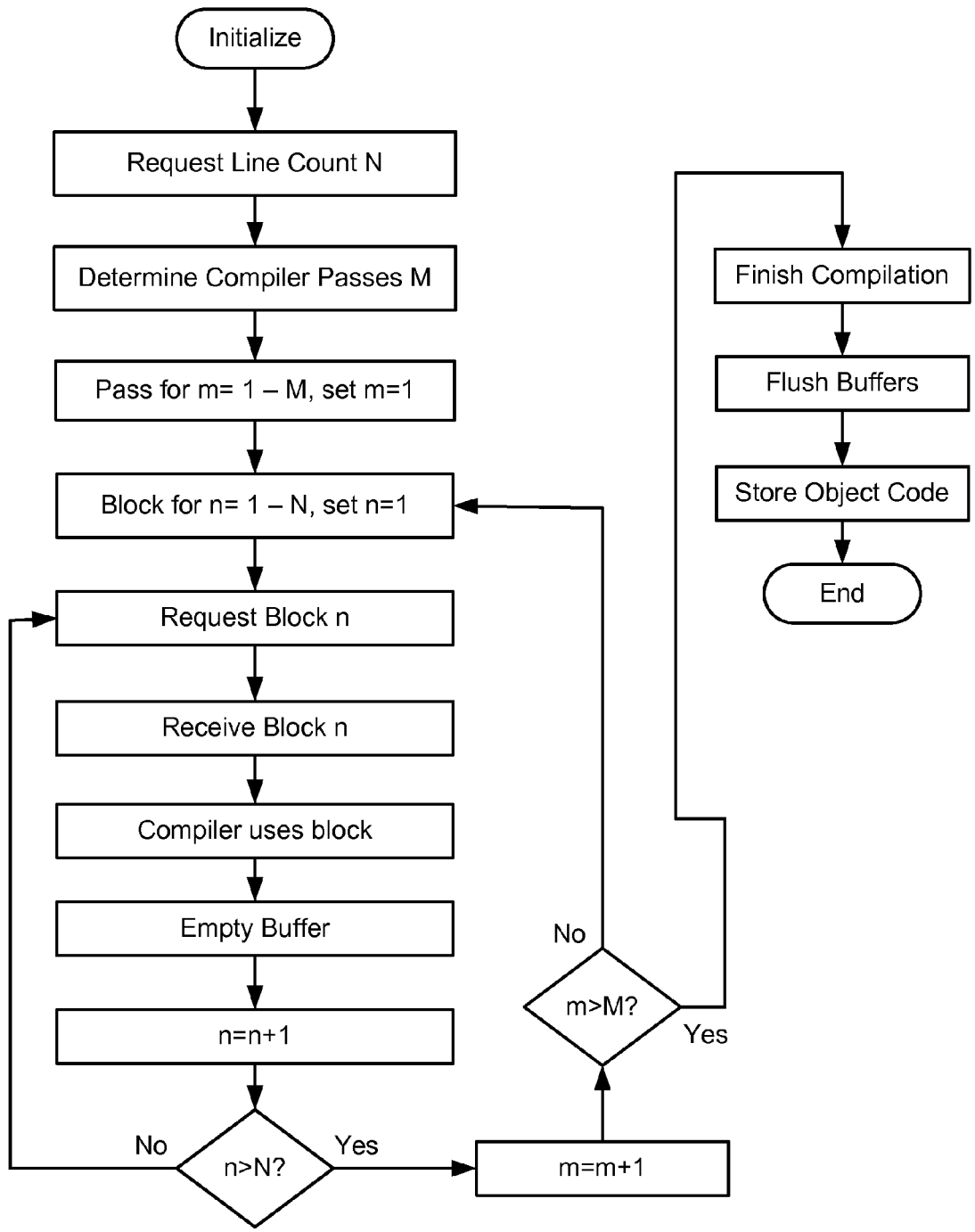
FIG. 5 illustrates the case where the source is retrieved and processed one step at a time.

FIG. 5 illustrates the essence of collecting single lines of program code to a buffer in the compiler for each line N of source code and over all passes M of the compiler. A line counter may be incremented to request and process all lines of source and then the compiler may move to its next pass and incrementing its pass counter after each complete reading of the source file. Although this may be slower and less efficient than collecting the entire file, it has the marked benefit of obfuscating the file from interception efforts. Coupled with rolling encryption, the task of successful interception becomes daunting.

In another embodiment where the desired source is held remotely, the receiving computer may place an active request for a line or data block from the source file. The host computer, usually that machine owned by the owner of the source code for the application software may respond by sending a data block comprising a single line from the source code. This data block may be encrypted using an encryption key. In one embodiment, a fixed block length may be requested and in this case the encryption algorithm may pad any real data so that all information transmissions send the same number of bits. In general, the host machine would not usually transmit any comment text but only program text; lacking any plain text, an interceptor would have no logical starting point to have any reasonable expectation of recovering program information. As each line is received, it may be decoded and used by the compiler. This action would empty the receive buffer thus discarding the program line from memory and then a new request may be sent for the next line until the entire file has been read. This process may be repeated until the compiler has read the file as many times as necessary in order to be able to complete its task and produce a compiled object. The digital certificate may be requested as fixed length blocks, variable length blocks or as a single stream. The certificate information may be stored until the object is compiled whereupon it may then be discarded and erased from memory.

In a further embodiment useful where an application is being developed as a bespoke project, the compiler function may be operated on a machine located at the secure premises of the application developer so that the digital certificate may be stored in encrypted form and only the digital certificate need be decoded prior to compilation. Because the digital certificate is generally a short file, in comparison with the application source code, the decoding process may be less cumbersome than when the application source must be decoded. In the same way, the digital certificate may be divided into elemental parts so that at no time need the certificate appear in the clear in its entirety.

A number of methods all known in the art may be used to further enhance the security of the system. For example, the compiler may suspend or terminate other processes which may be running at the same time as the compiler and which may attempt to access or read the same data. The creation of files other than those created by the compiler may be prevented until the compilation process is complete. Other processes may be denied access to memory during the compilation process. External communication may be prevented during compilation and data stored for later transmission may be eradicated.

While this invention has been described in terms of several embodiments, there are alterations, modifications, permutations, and substitute equivalents, which fall within the scope of this invention. It is therefore intended that the following appended claims be interpreted as including all such alterations, modifications, permutations, and substitute equivalents as fall within the true spirit and scope of the present invention.

What is claimed is:

1. A method of providing a secure environment for compilation of an authorized application, the method comprising the steps of:
   receiving, at a server, encrypted application data from a first party;
   decrypting, at the server, the encrypted application data to produce decrypted application data;
   receiving, at the server, encrypted authorization data from a second party, different from the first party;
   decrypting, at the server, the encrypted authorization data to produce decrypted authorization data; and
   providing the decrypted application data and the decrypted authorization data to a compiler adapted to compile an application authorized for an intended type of device,
   wherein the decrypted authorization data is indicative of authorization by a third party for the application to run on the intended type of device, and
   wherein the decrypted authorization data enables the application to run on a device of the intended type.

2. The method according to claim 1, wherein the decrypted authorization data comprises a digital certificate.

3. The method according to claim 1, wherein the decrypted authorization data identifies an association with the second party.

4. The method according to claim 1, wherein the decrypted application data and the decrypted authorization data are securely provided to the compiler for compilation.

5. The method according to claim 1, wherein the encrypted application data is decrypted using a first decoding key associated with the first party and the encrypted authorization data is decrypted using a second decoding key associated with the second party.

6. The method according to claim 1, wherein the step of providing the decrypted application data and the decrypted authorization data to the compiler for compilation is performed in response to a request from the compiler.

7. The method according to claim 1, further comprising: compiling the decrypted application data and the decrypted authorization data together to produce the authorized application.

8. A server for providing a secure environment for compilation of an authorized application, the server being configured to:
   receive encrypted application data from a first party;
   decrypt the encrypted application data to produce decrypted application data;
   receive encrypted authorization data from a second party, different from the first party;
   decrypt the encrypted authorization data to produce decrypted authorization data; and
   provide the decrypted application data and the decrypted authorization data to a compiler adapted to compile an application authorized for an intended type of device,
   wherein the decrypted authorization data is indicative of authorization by a third party for the application to run on the intended type of device, and
   wherein the decrypted authorization data enables the application to run on a device of the intended type.

9. The server according to claim 8, wherein the decrypted authorization data comprises a digital certificate.

10. The server according to claim 8, wherein the decrypted authorization data identifies an association with the second party.

11. The server according to claim 8, further configured to:
    securely provide the decrypted application data and the decrypted authorization data to the compiler for compilation.

12. The server according to claim 8, further configured to: decrypt the encrypted application data using a first decoding key associated with the first party and to decrypt the encrypted authorization data using a second decoding key associated with the second party.

13. The server according to claim 8, further configured to provide the decrypted application data and the decrypted authorization data to the compiler for compilation in response to a request from the compiler.

14. The server according to claim 8, further configured to: compile the decrypted application data and the decrypted authorization data together to produce the authorized application.

15. A non-transitory, computer-readable storage medium comprising computer-readable instructions stored thereon, the computer-readable instructions, when executed by a server, cause the server to perform a method of providing a secure environment for compilation of an authorized application, the method comprising the steps of:
    receiving, at the server, encrypted application data from a first party;
    decrypting, at the server, the encrypted application data to produce decrypted application data;
    receiving, at the server, encrypted authorization data from a second party, different from the first party;
    decrypting, at the server, the encrypted authorization data to produce decrypted authorization data; and
    providing the decrypted application data and the decrypted authorization data to a compiler adapted to compile an application authorized for an intended type of device,
    wherein the decrypted authorization data is indicative of authorization by a third party for the application to run on the intended type of device, and
    wherein the decrypted authorization data enables the application to run on a device of the intended type.

16. A method of providing a secure environment for generation of authorized content, the method comprising the steps of:
    receiving, at a server, encrypted content data from a first party;
    decrypting, at the server, the encrypted content data to produce decrypted content data;
    receiving, at the server, encrypted authorization data from a second party different from the first party;
    decrypting, at the server, the encrypted authorization data to produce decrypted authorization data; and
    providing the decrypted content data and the decrypted authorization data to a compiler adapted to compile content authorized for an intended type of device,
    wherein the decrypted authorization data is indicative of authorization by a third party for the content to be accessed by the intended type of device, and
    wherein the decrypted authorization data enables the content to be accessed by a device of the intended type.

17. The method according to claim 1, wherein the third party is a vendor of the device.

18. The method according to claim 1, wherein the appliance device is configured with an operating system associated with the third party.

* * * * *